UNITED STATES PATENT OFFICE.

JACOB W. DECASTRO, OF MAHWAH, NEW JERSEY.

PROCESS OF MAKING CONDENSED MILK.

SPECIFICATION forming part of Letters Patent No. 274,469, dated March 27, 1883.

Application filed December 24, 1881. (No specimens.)

*To all whom it may concern:*

Be it known that I, JACOB W. DECASTRO, a citizen of the United States, residing at Mahwah, in the county of Bergen and State of New Jersey, have invented a new and useful Process of Making Condensed Milk; and I hereby declare the following to be a full, clear, and exact description thereof.

My invention relates to a method or process of producing condensed milk, without sugar, of superior keeping qualities, and of natural taste and flavor.

Condensed milk made with sugar is manifestly an inferior article as compared with condensed milk without sugar, since the latter requires only to be diluted with water (provided certain defects be avoided, as is done by my invention) to give it the natural taste and flavor of milk fresh from the cow, whereas the former can, under no circumstances, be made identical with natural milk, owing to the presence of the large proportion of sugar contained in it. Condensed milk has of late been made without sugar, but subject to certain serious defects. These are chiefly inferior keeping qualities and a taste and flavor of boiled milk. It is these defects which I mainly seek to avoid by my invention, a description of which is as follows:

I boil the milk in open vessels G, or *in vacuo*, or in closed vessels under a high pressure of steam or air, for a sufficient length of time to destroy the bacteria and germs of fermentation contained in the milk. I then condense it in open vessels or *in vacuo*, though not to a higher specific gravity than will permit it freely to percolate the filtering medium which I employ. After this condensation has been effected I filter the milk through such filtering medium, whereby I remove the taste or flavor of burned milk, and at the same time remove any coloring-matter which may have been formed in the milk by the previous operation. After filtration the milk is further condensed to any desired gravity, either in open vessels or *in vacuo*. I may in certain cases also filter the milk immediately after the first boiling, (for the purpose of destroying the bacteria and germs of fermentation,) and then condense it further, with or without a second filtration, and turn it out at a lower specific gravity than the ordinary condensed milk has. This I do if the milk is designed for immediate consumption—as for city use, for example; but it is preferable to continue the condensation nearly or quite to the same point of density as that of condensed milk generally.

It is a well-known fact that wood-char, animal charcoal, and other filtrating substances have the property of absorbing disagreeable tastes, flavors, and odors. This property has, however, never before been utilized in its application to milk.

I have thus far confined myself to an outline of my process, referring to the steps in general terms. The filtration, however, in order to render it practicable, must be conducted in a particular manner, which I shall now proceed to describe.

Animal charcoal, which I prefer to use, absorbs from the milk which is run through it all or nearly all disagreeable flavor, taste, &c.; but at the same time it retains the whole or a great part of the fatty matter which is contained in the milk, thus rendering it practically valueless. If, however, the animal charcoal be saturated with water or other fluids, it loses the power of absorbing fat, and hence I moisten the char with a separate fluid, preferably hot water, before filtering the milk through it, thus curing the defect named. This discovery forms an important element of my process. Char through which steam has been blown will do for my purpose in the same manner as char moistened by liquids, and has this advantage, that certain bacteria and fermenting germs which survive the heat of boiling water are destroyed by the greater heat of the steam. I may also blow heated air through the char for the purpose of destroying bacteria and germs, and then follow up the air by steam or hot water for the purpose of moistening the char. I may also prepare the char in a special manner before using it for filtration—as, for instance, by treating it with hydrochloric or other acids, whereby I clean the char and make it more porous, thus improving both its power of decolorization and its power of absorbing disagreeable tastes and flavors.

During the whole process I take particular care to avoid as much as possible exposure of the milk to air and the mixture of air therewith.

It is difficult in certain cases to wash out a filter containing milk, as milk, especially thick milk, adheres strongly to the char. In this case I use steam or hot air to drive the milk out of the filtering materials.

What I claim as new, and desire to secure by Letters Patent, is—

1. In the manufacture of condensed milk by means of boiling, filtration, and evaporation, the process of filtering the boiled milk without material loss of the fatty elements thereof, which consists in moistening the filtering medium with a separate fluid and then passing the boiled milk through such medium, as set forth.

2. The process of producing condensed milk without saccharine matter, which consists in boiling the milk, and subsequently filtering and evaporating it, substantially as described.

JACOB W. DECASTRO.

In presence of—
A. H. MAAS,
G. O. GOESSLING.